United States Patent
Chu et al.

(10) Patent No.: US 10,396,963 B1
(45) Date of Patent: Aug. 27, 2019

(54) FRAME FORMATS FOR MULTI-USER ACKNOWLEDGMENT INFORMATION

(71) Applicant: Marvell International Ltd., Hamilton (BM)

(72) Inventors: Liwen Chu, San Ramon, CA (US); Ken Kinwah Ho, San Jose, CA (US); Seong Yong Park, San Jose, CA (US); Tianan Tim Ma, Palo Alto, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 10 days.

(21) Appl. No.: 15/709,186

(22) Filed: Sep. 19, 2017

Related U.S. Application Data

(60) Provisional application No. 62/396,468, filed on Sep. 19, 2016.

(51) Int. Cl.
*H04L 5/00* (2006.01)
*H04L 1/16* (2006.01)
*H04W 84/12* (2009.01)

(52) U.S. Cl.
CPC .......... *H04L 5/0055* (2013.01); *H04L 1/1614* (2013.01); *H04L 5/0046* (2013.01); *H04W 84/12* (2013.01)

(58) Field of Classification Search
CPC ... H04L 5/0055; H04L 1/1614; H04L 1/1621; H04L 1/1685; H04L 5/0053; H04L 2001/0093; H04L 1/1671; H04L 5/0094; H04L 1/00; H04L 1/1628; H04L 1/1635; H04L 1/1858; H04L 1/1887; H04L 5/00;
(Continued)

(56) References Cited

U.S. PATENT DOCUMENTS 9,729,214 B2 8/2017 Chu et al.
2005/0270978 A1 12/2005 Haines
(Continued)

OTHER PUBLICATIONS

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

(Continued)

*Primary Examiner* — Daniel Lai

(57) ABSTRACT

A first communication device generates a packet associated with acknowledgment of frames corresponding to multiple second communication devices. Generating the packet includes generating a frame that includes a field having respective acknowledgment information for the multiple second communication devices in respective subfields. The subfields have a plurality of different formats. The subfields are arranged within the field in groups of adjacent subfields such that each group includes only subfields of a same format and/or includes only subfields corresponding to second communication devices that have communicated to the first communication device a same set of supported formats of the subfields. The first communication device transmits the packet to the multiple second communication devices.

20 Claims, 10 Drawing Sheets

(58) Field of Classification Search
CPC ............. H04L 12/1868; H04L 12/1872; H04L 1/0003; H04L 1/0029; H04L 1/0045; H04L 1/0057; H04L 1/0058; H04L 1/0072; H04L 1/009; H04L 1/1678; H04L 1/1829; H04L 2212/00; H04L 5/003; H04L 5/0046; H04W 84/12; H04W 72/0446; H04W 72/042; H04W 88/08; H04W 28/06; H04W 52/0216; H04W 72/04; H04W 72/121; H04W 28/04; H04W 72/1289; H04W 72/005
See application file for complete search history.

(56) References Cited

U.S. PATENT DOCUMENTS

| | | | | |
|---|---|---|---|---|
| 2006/0034274 | A1* | 2/2006 | Kakani | H04L 1/1829 370/389 |
| 2007/0110091 | A1* | 5/2007 | Kwon | H04B 7/0613 370/445 |
| 2009/0268709 | A1 | 10/2009 | Yu | |
| 2011/0235593 | A1 | 9/2011 | Gong et al. | |
| 2012/0195250 | A1* | 8/2012 | Jain | H04L 1/1614 370/312 |
| 2012/0314697 | A1* | 12/2012 | Noh | H04L 1/1628 370/338 |
| 2013/0230059 | A1 | 9/2013 | Quan et al. | |
| 2015/0063190 | A1 | 3/2015 | Merlin et al. | |
| 2015/0103767 | A1 | 4/2015 | Kim et al. | |

OTHER PUBLICATIONS

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE Std 802.11—REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

* cited by examiner

A first communication device generates a frame that includes a field having respective acknowledgment information for multiple second communication devices in respective subfields, wherein the subfields have a plurality of different formats, and wherein the subfields are arranged within the field in groups of adjacent subfields such that each group i) includes only subfields of a same format, and/or ii) includes only subfields corresponding to second communication devices that have communicated to the first communication device a same set of supported acknowledgment techniques corresponding to a same set of formats of the subfields 804

↓

The first communication device generates a PHY data unit that includes the frame 808

US 10,396,963 B1

FRAME FORMATS FOR MULTI-USER ACKNOWLEDGMENT INFORMATION

CROSS REFERENCES TO RELATED APPLICATIONS

This application claims the benefit of U.S. Provisional Patent Application No. 62/396,468, entitled "Optimization of M-BA and MU-BAR," filed on Sep. 19, 2016, the disclosure of which is hereby expressly incorporated herein by reference in its entirety.

FIELD OF TECHNOLOGY

The present disclosure relates generally to wireless communication systems, and more particularly to multi-user communications that involve simultaneous transmissions to or from multiple communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11 ac Standard specifies a single-user peak throughput in the gigabits per second (Gbps) range. Future standards promise to provide even greater throughput, such as throughputs in the tens of Gbps range.

A communication protocol defined by the IEEE 802.11ax Standard, now under development, will utilize multi-user (MU) communication techniques that involve simultaneous transmissions to or from multiple communication devices, such as MU multiple input, multiple output (MIMO) techniques and orthogonal frequency division multiple access (OFDMA) techniques.

SUMMARY

In an embodiment, a method for communication in a wireless communication network includes generating, at a first communication device, a packet associated with acknowledgment of frames corresponding to multiple second communication devices. Generating the packet associated with acknowledgment of frames corresponding to multiple second communication devices includes generating a frame that includes a field having respective acknowledgment information for the multiple second communication devices in respective subfields, wherein the subfields have a plurality of different formats, and wherein the subfields are arranged within the field in groups of adjacent subfields such that each group i) includes only subfields of a same format, and/or ii) includes only subfields corresponding to second communication devices that have communicated to the first communication device a same set of supported formats of the subfields. The method also includes transmitting, by the first communication device, the packet to the multiple second communication devices.

In another embodiment, an apparatus comprises a network interface device associated with a communication device. The network interface device includes one or more integrated circuits (ICs) configured to: generate a packet associated with acknowledgment of frames corresponding to multiple second communication devices, including: generating a frame that includes a field having respective acknowledgment information for the multiple second communication devices in respective subfields, wherein the subfields have a plurality of different formats, and wherein the subfields are arranged within the field in groups of adjacent subfields such that each group i) includes only subfields of a same format, and/or ii) includes only subfields corresponding to second communication devices that have communicated to the first communication device a same set of supported formats of the subfields. The network interface device is configured to transmit the packet to the multiple second communication devices.

BRIEF DESCRIPTION OF THE DRAWINGS

FIG. 8 is a flow diagram of an example method for communication in a wireless communication network, according to an embodiment.

DETAILED DESCRIPTION

In some wireless communication networks, multi-user (MU) communication techniques that involve simultaneous transmissions to or from multiple communication devices are used to increase system throughput. Examples of MU communication techniques include MU multiple input, multiple output (MIMO) techniques and orthogonal frequency division multiple access (OFDMA) techniques.

A communication protocol that uses MU communications may define different block acknowledgment techniques for use with MU communications, but may not require that all of the block acknowledgment techniques be supported by communication devices. Similarly, the communication protocol may define different formats for block acknowledgment information, but may not require that all of the formats be supported by communication devices. Accordingly, embodiments of techniques are described below for communicating block acknowledgment information in a MU data unit to multiple communication devices that may support different subsets of block acknowledgment techniques defined by a communication protocol, and/or different subsets of formats for block acknowledgment information.

Figure 1:
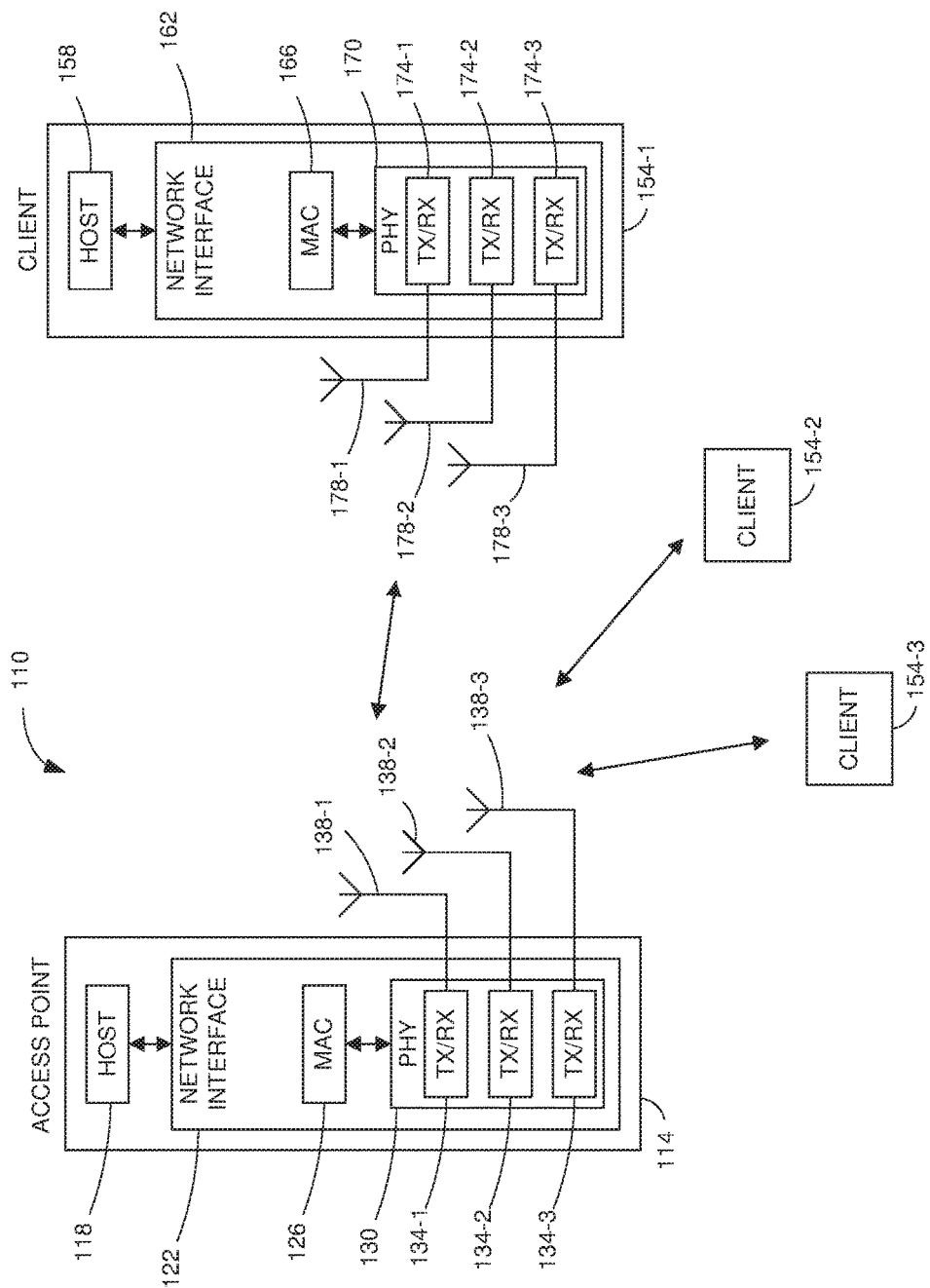
FIG. 1 is a block diagram of an example wireless local area network (WLAN) in which a multi-user (MU) data units are exchanged, according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units (sometimes referred to herein as "packets") such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

The AP 114 and the client stations 154 employ MU communication techniques that involve simultaneous transmissions to or from multiple communication devices are used to increase system throughput. For example, the AP 114 and the client stations 154 use MU MIMO techniques in which different data streams are simultaneously transmitted via different spatial streams, according to some embodiments. As another example, the AP 114 and the client stations 154 use OFDMA techniques in which different data streams are simultaneously transmitted via different frequency bands, according to some embodiments. In some embodiments, MU MIMO techniques and OFDMA techniques are used during the same MU transmission, e.g., to transmit some data streams via different frequency bands and to transmit some data streams via different spatial streams within a same frequency band. A downlink (DL) MU transmission refers to an MU transmission from the AP 114 to multiple client stations 154. An uplink (UL) MU transmission refers to an MU from multiple client stations 154 to the AP 114.

Figure 2:
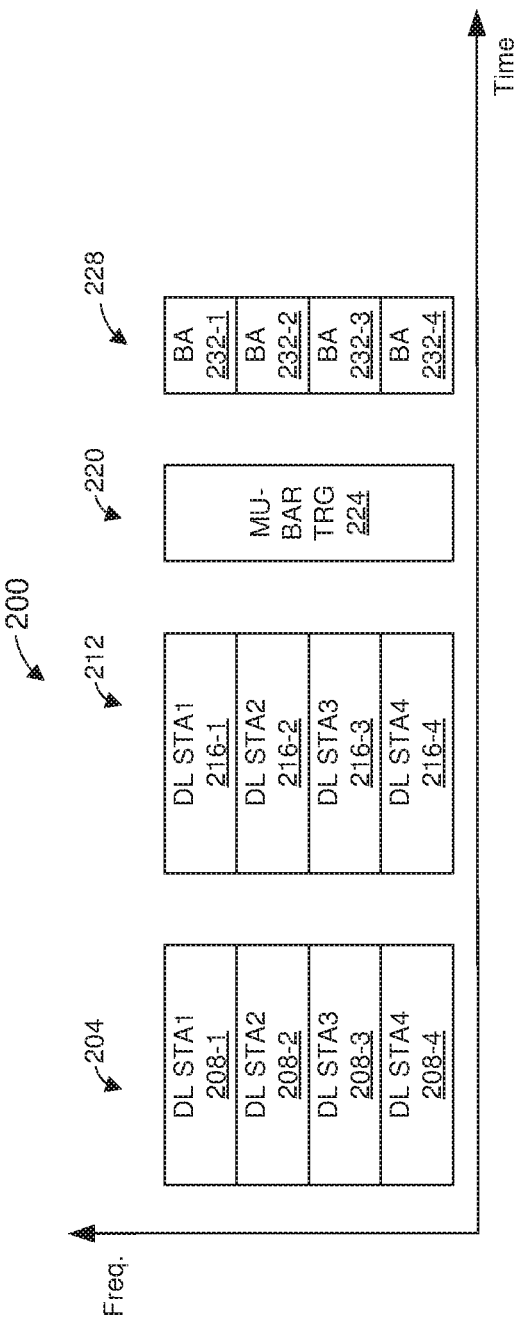
FIG. 2 is a timing diagram of an example communication exchange between the access point and a group of client stations of FIG. 1, according to an embodiment.

FIG. 2 is a diagram of an example communication exchange 200 between the AP 114 and a group of client stations 154, according to an embodiment. The communication exchange 200 includes a DL MU PHY data unit 204 generated and transmitted by the AP 114. The DL MU PHY data unit (e.g., a DL MU PPDU) 204 includes a plurality of data frames 208 respectively included in different frequency bands, sometime referred to herein as frequency resource units (RUs). Each data frame 208 is intended for a different client station 154 and each data frame 208 includes different data. As used herein, the term "frame" refers to a MAC data unit, such as an MPDU, an MSDU, an aggregate MPDU (A-MPDU), etc.

The AP 114 also generates a DL MU PHY data unit 212 and subsequently transmits the DL MU PHY data unit 212. The DL MU PHY data unit (e.g., a DL MU PPDU) 212 includes a plurality of data frames 216 respectively included in different frequency RUs. Each data frame 216 is intended for a different client station 154 and each data frame 216 includes different data.

The AP 114 also generates a DL PHY data unit 220 (e.g., a DL single user (SU) PHY data unit addressed to a group of client stations) and subsequently transmits the DL PHY data unit 220. The DL MU PHY data unit (e.g., a DL SU PPDU) 220 includes a trigger frame 224 configured to prompt a group of client stations 154 to transmit an UL MU PHY data unit 228 (e.g., an UL MU PPDU) a suitable time period after an end of the DL PHY data unit 220. More specifically, in the example communication exchange 200, the trigger frame 224 is configured to prompt the group of client stations 154 to transmit, within the UL OFDMA PHY data unit 228, block acknowledgements (BAs) 232 of the data frames 208 and 216. In an embodiment, a communication protocol according to which the AP 114 and the client stations 154 operated defines a plurality of trigger frames of different types, the trigger frame 224 is a multi-user block acknowledgment (MU-BAR) type trigger frame (also referred to herein as an MU-BAR trigger).

As will be described below, the MU-BAR trigger includes a field (e.g., a per user information field) that includes a plurality of subfields, each subfield including block acknowledgment information for a particular client station 154 (user). In some embodiments, the communication protocol defines different block acknowledgment techniques and the subfields have different formats depending on the block acknowledgment technique being used. Additionally, in some embodiments, the communication protocol does not make support of all of the different block acknowledgment techniques mandatory.

Figure 3A:
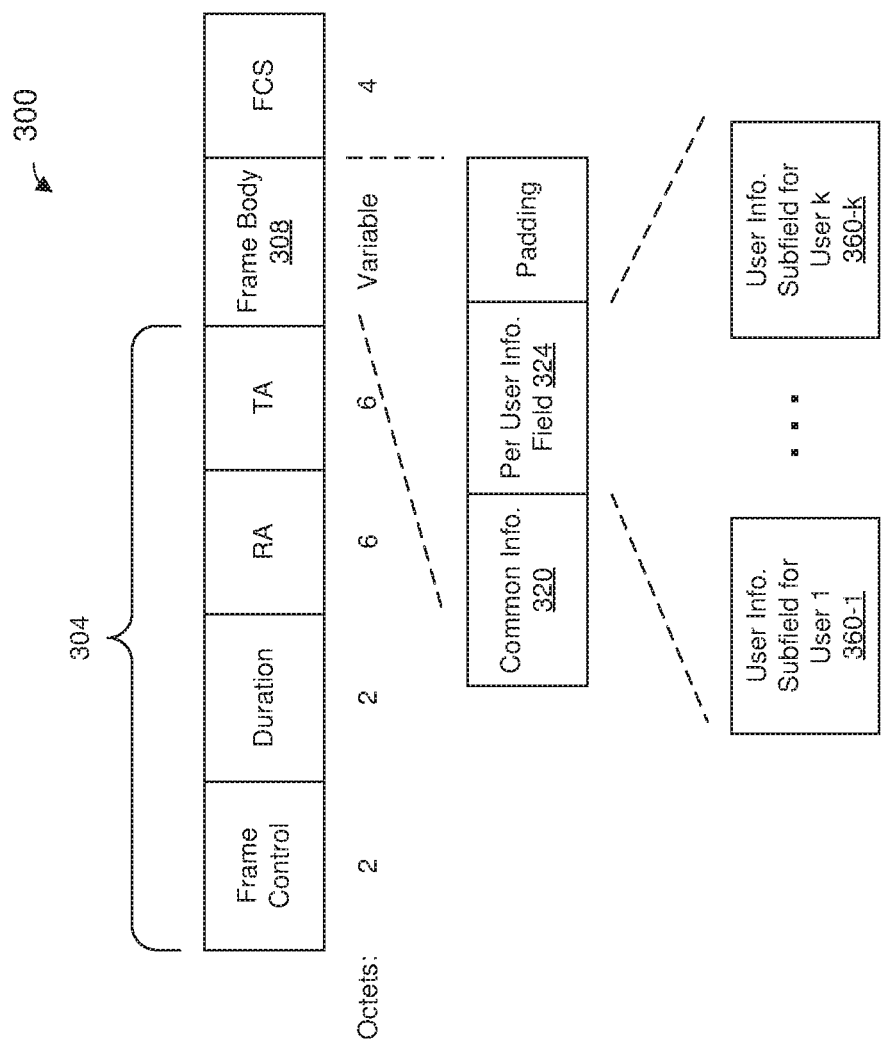
FIG. 3A is a block diagram of an example MU block acknowledgment request (MU-BAR) frame, according to an embodiment.

FIG. 3A is a diagram of an example MU-BAR trigger frame 300 according to an embodiment. In an embodiment, the MAC processor 126 (FIG. 1) generates the MU-BAR trigger frame 300 and provides the MU-BAR trigger frame 300 to the PHY processor 130, which then generates a DL PHY data unit (e.g., a DL SU PHY data unit addressed to a group of client stations) for transmission to a group of client stations 154. In other embodiments, another suitable communication device generates the MU-BAR trigger frame 300. FIG. 3A includes example numbers of octets of various fields of the MU-BAR trigger frame 300. In other embodiments, different suitable numbers of octets are utilized. In other embodiments, one or more of the fields illustrated in FIG. 3A are omitted, and/or one or more additional fields are included.

The MU-BAR trigger frame 300 includes a MAC header 304 and a frame body 308. The frame body 308 includes a common information field 320 and a per user information field 324. The common information field 320 includes information that is intended for all of the client stations 154 that are intended recipients of the trigger frame 300. On the other hand, the per user information field 324 includes a plurality of subfields 360 that correspond to respective intended recipients of the trigger frame 300 and include respective information specific to, and intended for, the respective intended recipients.

Figure 3B:
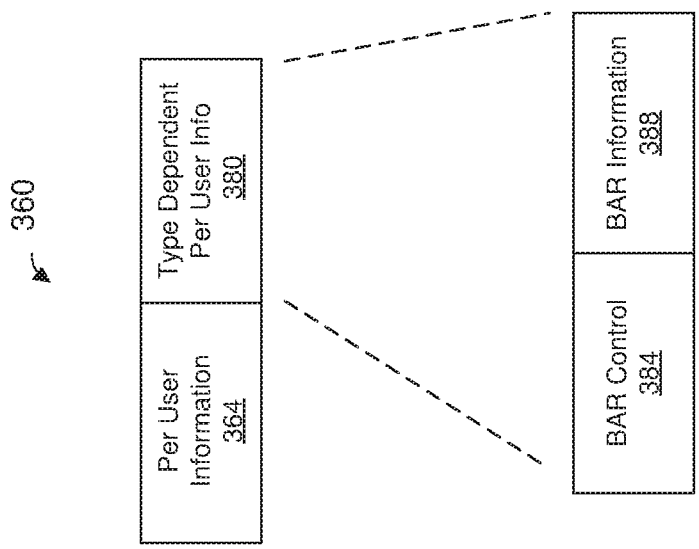
FIG. 3B is a block diagram of an example subfield included in a per user information field of the MU-BAR frame of FIG. 3A, according to an embodiment.

FIG. 3B is a diagram of an example of the per user information subfield 360, according to an embodiment. In an embodiment, the MU-BAR trigger frame 300 includes a respective per user information subfield 360 for each client station 154 that is an intended recipient of the MU-BAR trigger frame 300. The per user information subfield 360 includes a per user information subfield 364 and a type dependent per user information subfield 380. The type dependent per user information subfield 380 includes different types of information for different block acknowledgment techniques and the subfield 380 has a different format depending on the block acknowledgment technique being used, in an embodiment.

A first example block acknowledgment technique defined by the communication protocol corresponds to a block acknowledgment only for data frames corresponding to a single traffic class corresponding to a single traffic identifier (TID). A second example block acknowledgment technique defined by the communication protocol corresponds to a block acknowledgment for data frames corresponding to multiple traffic classes corresponding to multiple TIDs. A third example block acknowledgment technique defined by the communication protocol corresponds to a block acknowledgment used for data frames transmitted using a groupcast technique (sometimes referred to as groupcast with retries (GCR)). In some embodiments, the communication protocol defines the first acknowledgment technique as mandatory and at least the second and/or third block acknowledgment techniques as optional. In an embodiment, the communication protocol defines the second acknowledgment technique as mandatory when a device supports the third block acknowledgment technique. A per user information subfield 360 for the first block acknowledgment technique has a first format; a per user information subfield 360 for the second block acknowledgment technique has a second format; and per user information subfield 360 for the third block acknowledgment technique has a third format, according to an embodiment. The second format is different than the first format, and the third format is different than the first format and the second format, according to an embodiment.

In another embodiment, a first example block acknowledgment technique defined by the communication protocol corresponds to GCR for data frames corresponding to only a single traffic class corresponding to a single TID; and a second example block acknowledgment technique defined by the communication protocol corresponds to GCR for data frames corresponding to multiple traffic classes corresponding to multiple TIDs. A per user information subfield 360 for the first block acknowledgment technique has a first format; and a per user information subfield 360 for the second block acknowledgment technique has a second format, where the second format is different than the first format, according to an embodiment.

Figure 4:
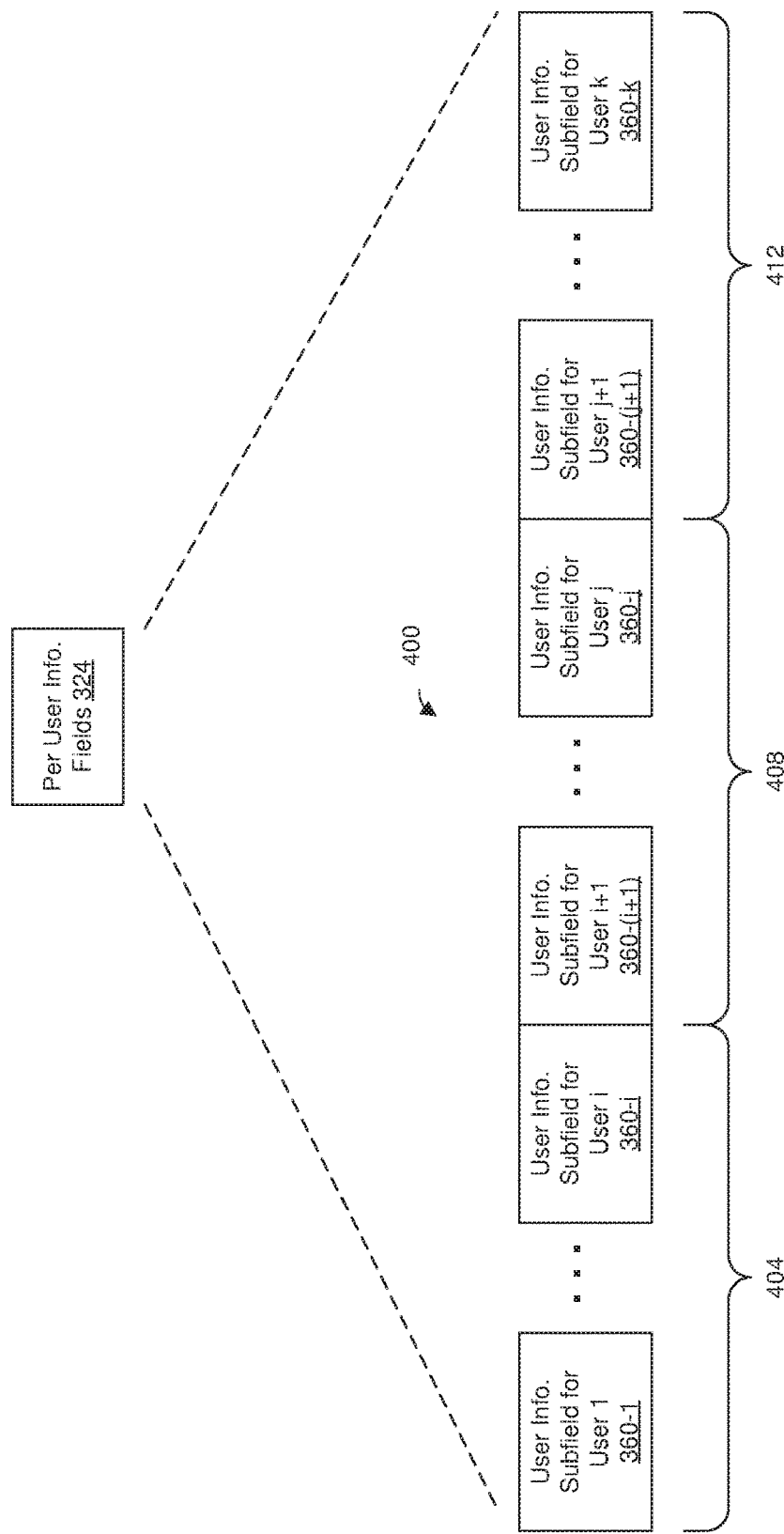
FIG. 4 is a block diagram of an example arrangement of subfields of FIG. 3B within the field of the MU-BAR frame of FIG. 3A, according to an embodiment.

FIG. 4 is a diagram of an example arrangement of per user information subfields 360 within the MU-BAR trigger frame 300, according to an embodiment. In particular, the diagram of FIG. 4 illustrates an example ordering of per user information subfields 360 within the MU-BAR trigger frame 300. For example, the ordering from left to right depicted in FIG. 4 corresponds to an order according to which client stations 154 will process the per user information subfields 360 after receiving the MU-BAR trigger frame 300.

In an embodiment, the per user information subfields 360 are arranged within the field 324 in groups 404, 408, 412 of adjacent subfields such that each group 404, 408, 412 includes only subfields of a same format. For example, in an embodiment, group 404 includes only per user information subfields 360 that correspond to non-GCR BAR information for data frames corresponding to a single TID (referred to herein as "single TID BAR"); group 408 includes only per user information subfields 360 that correspond to non-GCR BAR information for data frames corresponding to multiple TIDs (referred to herein as "multiple TID BAR"); and group 412 includes only per user information subfields 360 that correspond to BAR information for data frames corresponding to GCR (referred to herein as "GCR BAR").

When processing the field 324, client stations start at the subfield 360-1 and continue processing subsequent subfields 360 (moving to the right in FIG. 4), and may stop processing the field 324 upon encountering a subfield 360 with a format that is not recognized, according to an embodiment. For example, a client station 154 that does not support multiple TID BAR and does not support GCR BAR starts at the subfield 360 and continues processing subsequent subfields 360 (moving to the right in FIG. 4) until, for example, encountering the subfield 360-($i$+1) in group 408, which is of the second format different than the first format; in response to encountering the subfield 360-($i$+1), the client station 154 stops processing the field 324.

As another example, a client station 154 that does not support GCR BAR starts at the subfield 360 and continues processing subsequent subfields 360 (moving to the right in FIG. 4) until, for example, encountering the subfield 360-($j$+1) in group 412, which is of the third format different than the first and second formats; in response to encountering the subfield 360-($j$+1), the client station 154 stops processing the field 324.

Although the example illustrated in FIG. 4 includes three groups 404, 408, 412, in other embodiments the per user information subfields 360 are arranged within the field 324 in other suitable numbers of groups such two, four, five, six, etc. For example, in an embodiment, two different trigger frames are used for non-GCR BAR and GCR BAR. In one such embodiment, the per user information subfields 360 of the non-GCR BAR trigger frame are arranged within the field 324 in two groups. For example, in an embodiment, group 404 includes only per user information subfields 360 that correspond to single TID BAR, and group 408 includes only per user information subfields 360 that correspond to multiple TID BAR. In this embodiment, a client station 154 that does not support multiple TID BAR starts at the subfield 360 and continues processing subsequent subfields 360 (moving to the right in FIG. 4) until, for example, encountering the subfield 360-($i$+1) in group 408, which is of the second format different than the first format; in response to encountering the subfield 360-($i$+1), the client station 154 stops processing the field 324.

In an embodiment, the per user information subfields 360 of a GCR BAR trigger frame are arranged within the field 324 in two groups. For example, in an embodiment, group 404 includes only per user information subfields 360 that correspond to single TID GCR BAR, and group 408 includes only per user information subfields 360 that correspond to multiple TID GCR BAR. In this embodiment, a client station 154 that does not support multiple TID GCR BAR starts at the subfield 360 and continues processing subsequent subfields 360 (moving to the right in FIG. 4) until, for example, encountering the subfield 360-($i$+1) in group 408, which is of the second format different than the first format; in response to encountering the subfield 360-($i$+1), the client station 154 stops processing the field 324.

Figure 5:
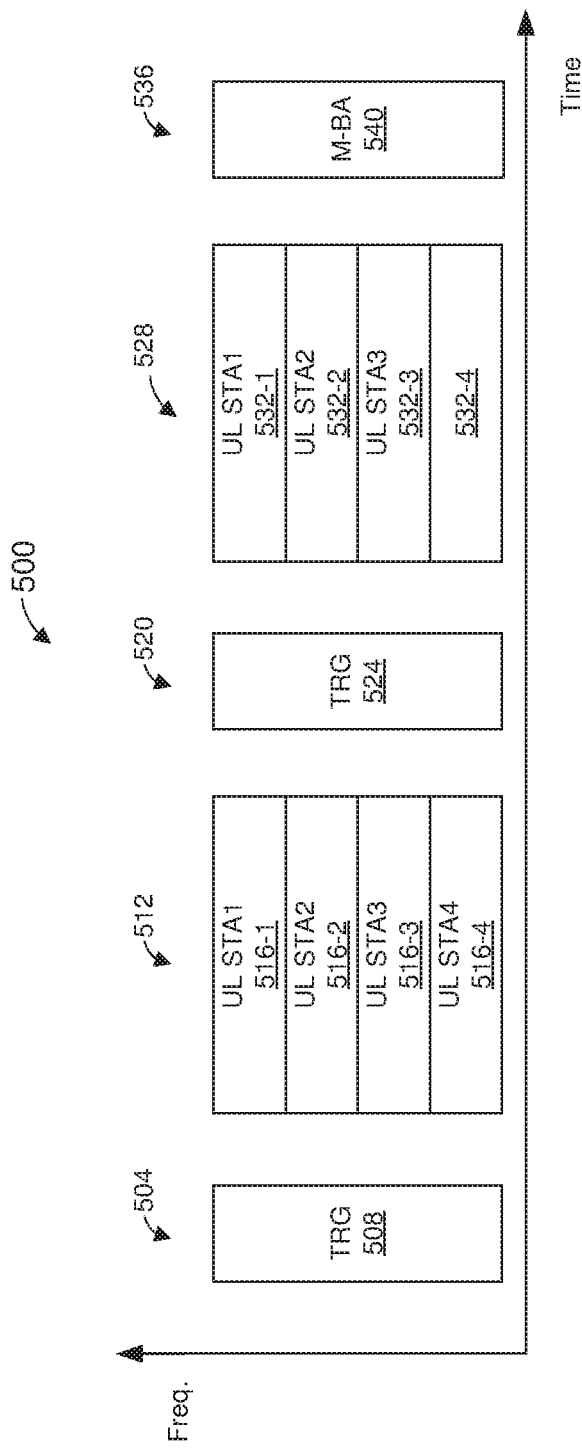
FIG. 5 is a timing diagram of another example communication exchange between the access point and a group of client stations of FIG. 1, according to an embodiment.

FIG. 5 is a diagram of another example communication exchange 500 between the AP 114 and a group of client stations 154, according to an embodiment. The communication exchange 500 includes a DL PHY data unit 504 (e.g., a DL SU PHY data unit addressed to a group of client stations) generated and transmitted by the AP 114. The DL PHY data unit (e.g., a DL SU PPDU) 504 includes a trigger frame 508. The trigger frame 508 is configured to prompt the group of client stations 154 to transmit, within an UL MU PHY data unit 512, UL data frames 516.

The AP 114 also generates a DL PHY data unit 520 (e.g., a DL SU PHY data unit addressed to a group of client stations) and subsequently transmits the DL PHY data unit 520. The DL PHY data unit (e.g., a DL SU PPDU) 530 includes a trigger frame 524. The trigger frame 524 is configured to prompt the group of client stations 154 to transmit, within an UL MU PHY data unit 528, UL data frames 532.

The AP 114 also generates a DL PHY data unit 536 (e.g., a DL SU PHY data unit addressed to a group of client stations) and subsequently transmits the DL PHY data unit 536. The DL PHY data unit (e.g., a DL SU PPDU) 536 includes a multi-station block acknowledgment (M-BA) frame 540 that acknowledges the UL data frames 516 and 532.

As will be described below, the M-BA frame 540 includes a field (e.g., a BA information field) that includes a plurality of subfields, each subfield including block acknowledgment information for a particular client station 154 (user). In some embodiments, the communication protocol defines different block acknowledgment techniques and the subfields have different formats depending on the block acknowledgment technique being used. Additionally, in some embodiments, the communication protocol does not make support of all of the different block acknowledgment techniques mandatory.

Figure 6A:
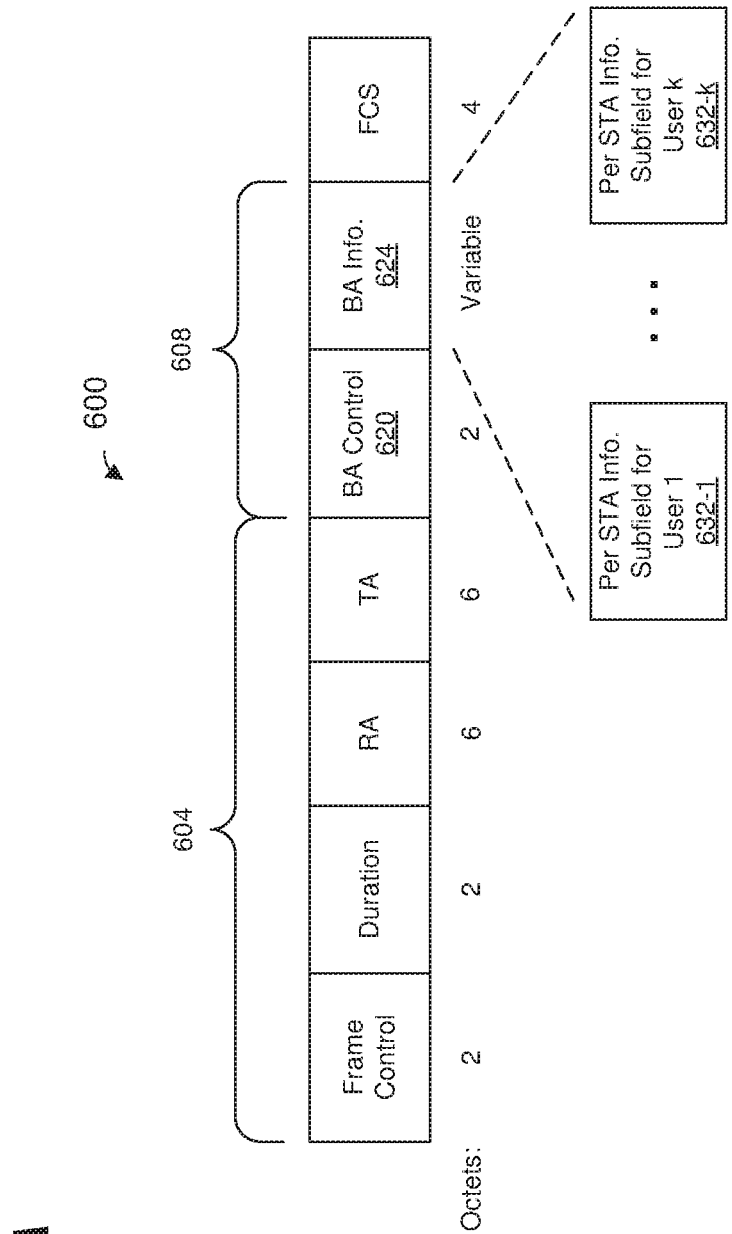
FIG. 6A is a block diagram of an example multi-station block acknowledgment (M-BA) frame, according to an embodiment.

FIG. 6A is a diagram of an example M-BA frame 600 according to an embodiment. In an embodiment, the MAC processor 126 (FIG. 1) generates the M-BA frame 600 and provides the M-BA frame 600 to the PHY processor 130, which then generates a DL PHY data unit (e.g., a DL SU PHY data unit addressed to a group of client stations) for transmission to a group of client stations 154. In other embodiments, another suitable communication device generates the M-BA frame 600.

FIG. 6A includes example numbers of octets of various fields of the M-BA frame 600. In other embodiments, different suitable numbers of octets are utilized. In other embodiments, one or more of the fields illustrated in FIG. 6A are omitted, and/or one or more additional fields are included.

The M-BA frame 600 includes a MAC header 604 and a frame body 608. The frame body 608 includes a BA control field 620, and a BA information field 624. The BA control field 620 includes BA information that is intended for all of the client stations 154 that are intended recipients of the M-BA frame 600. On the other hand, the BA information field 624 includes respective per user (STA) information subfields 632 corresponding to respective intended recipients of the M-BA frame 600 and include respective information specific to, and intended for, the respective intended recipients.

Figure 6B:
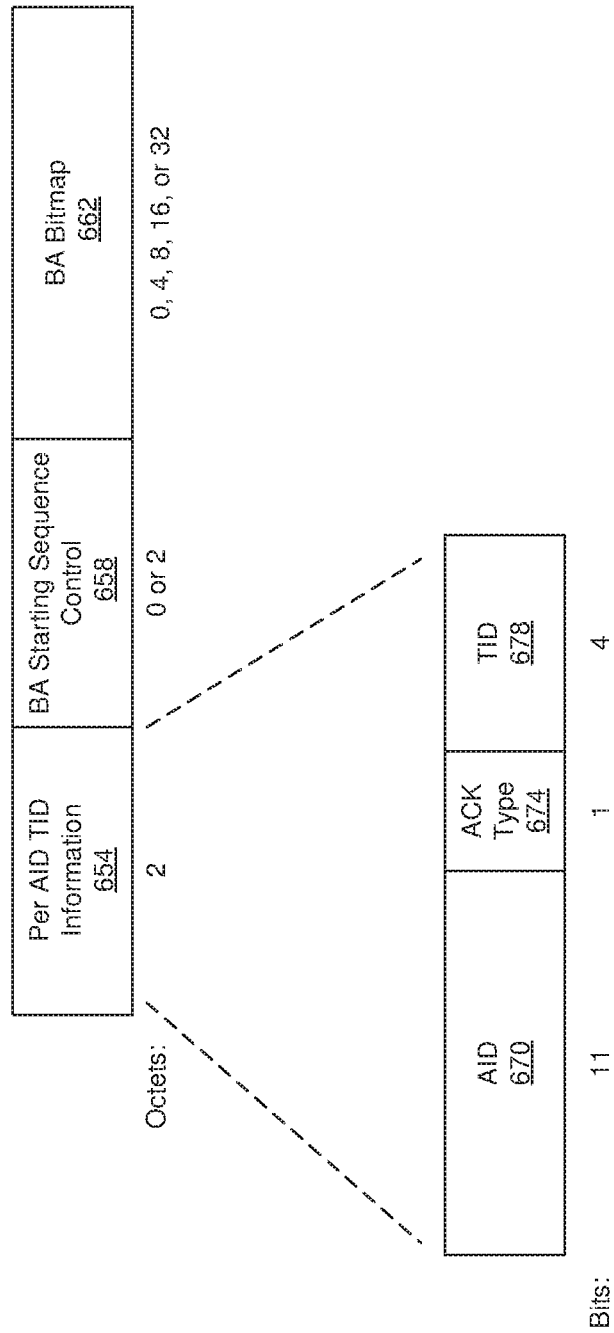
FIG. 6B is a block diagram of an example per user information field subfield included in a block acknowledgement information field of the M-BA frame of FIG. 6A, according to an embodiment.

FIG. 6B is a diagram of an example of the per user information subfield 632, according to an embodiment. FIG. 6B includes example numbers of octets and bits of various fields of the M per user information subfield 632. In other embodiments, different suitable numbers of octets and bits are utilized. In other embodiments, one or more of the fields illustrated in FIG. 6B are omitted, and/or one or more additional fields are included.

In an embodiment, the M-BA frame 600 includes a respective per user information subfield 632 for each client station 154 that is an intended recipient of the M-BA frame 600. The per user information subfield 632 includes a per association identifier (AID) TID information subfield 654, a BA starting sequence control subfield 658, and a BA bitmap field 662. The per AID TID information subfield 654 includes an AID subfield 670, an ACK type subfield 674, and a TID subfield 678. The AID subfield 670 includes an AID of a client station 154 to which the per user information subfield 632 corresponds. The ACK type subfield 674 indicates whether the acknowledgment to which the per user information subfield 632 corresponds is a single frame acknowledgment or a BA, according to an embodiment. The TID subfield 674 indicates a TID of the frame(s) that are being acknowledged, according to an embodiment.

In an embodiment, when the ACK type subfield 674 indicates a single frame acknowledgment, the BA starting sequence control subfield 658 and the BA bitmap field 662 are omitted from the per user information subfield 632.

The BA starting sequence control subfield 658 indicates a starting frame in a sequence of frames corresponding to the per user information subfield 632, and the BA bitmap subfield 662 indicates whether particular frames in the sequence are acknowledged. For example, each bit in the BA bitmap subfield 662 indicates whether a particular corresponding frame in the sequence is acknowledged, according to an embodiment.

In an embodiment, the communication protocol specifies that the per user information subfield 632 can be used to provide BA information for different lengths of frame sequences, and thus the communication protocol specifies that the BA bitmap subfield 662 can be of different defined sizes (e.g., 4, 8, 16, or 32 octets; or different suitable sets of sizes). On the other hand, the communication protocol specifies that support for BA of frame sequences of all of the different defined lengths is not mandatory, according to an embodiment. For example, the communication protocol specifies that support for BA of frame sequences of a subset of the defined lengths is mandatory, and support for BA of frame sequences of other ones of the defined lengths is optional.

Additionally, the communication protocol specifies that if a communication device supports BA of frame sequences of a first one of the optional lengths, then the communication must support for BA of frame sequences of one or more particular second optional lengths, according to an embodiment. As an illustrative example, the communication protocol defines: BA of frame sequences of length 64 (bitmap length=8 octets) is mandatory and BA of frame sequences of length 32 (bitmap length=4 octets) is optional. As another illustrative example, the communication protocol defines: BA of frame sequences of length 128 (bitmap length=16 octets) is optional, but if a communication device supports BA of frame sequences of length 128, the communication device must also support BA of frame sequences of length 32 (bitmap length=4 octets). As yet another illustrative example, the communication protocol defines: BA of frame sequences of lengths 128 (bitmap length=16 octets) and 256 (bitmap length=32 octets) are optional, but if a communication device supports BA of frame sequences of length 128 or 256, the communication device must support BA of frame sequences of lengths 128, 256, and 32 (bitmap length=4 octets).

A client station 154 reports to the AP 114 device capability information (e.g., included in one or more packets transmitted wirelessly by the client station 154 to the AP 114, for example), such as whether the client station 154 supports BA of frame sequences of one or more of lengths 32 (bitmap length=4 octets), 64 (bitmap length=8 octets), 128 (bitmap length=16 octets), or 256 (bitmap length=32 octets). Thus, the AP 114 records such capability information in a memory included in or coupled to the network interface device 122, for example, and thus has knowledge of which client stations 154 support BA of which length sequences.

In an embodiment, a first example block acknowledgment technique defined by the communication protocol corresponds to BA of frame sequences of length 64 (bitmap length=8 octets). A second example block acknowledgment technique defined by the communication protocol corresponds to BA of frame sequences of lengths 32 (bitmap length=4 octets) or 64 (bitmap length=8 octets). A third example block acknowledgment technique defined by the communication protocol corresponds to BA of frame sequences of lengths 32 (bitmap length=4 octets), 64 (bitmap length=8 octets), 128 (bitmap length=16 octets), or 256 (bitmap length=32 octets). In some embodiments, the communication protocol defines the first acknowledgment technique as mandatory and at least the second and/or third block acknowledgment techniques as optional. In an embodiment, the communication protocol defines the second acknowledgment technique as mandatory when a device supports the third block acknowledgment technique.

In an embodiment, per user information subfield 632 for BA of length 32 (bitmap length=4 octets) has a first format; a per user information subfield 632 for BA of length 64 (bitmap length=8 octets) has a second format; a per user information subfield 632 for BA of length 128 (bitmap length=16 octets); and a per user information subfield 632 for BA of length 256 (bitmap length=32 octets) has a fourth format, according to an embodiment. The second format is different than the first format; the third format is different than the first format and the second format; and the fourth format is different than the first format, the second format, and the third format, according to an embodiment.

In an embodiment, when a client station 154 reports to the AP 114 device capability information (e.g., included in one or more packets transmitted wirelessly by the client station 154 to the AP 114, for example), such as whether the client station 154 supports BA of frame sequences of one or more of lengths 32 (bitmap length=4 octets), 64 (bitmap length=8 octets), 128 (bitmap length=16 octets), or 256 (bitmap length=32 octets), the AP 114 thus has knowledge of, or can infer, which sets of formats of the per user information subfield 632 the client station 154 supports.

Figure 7:
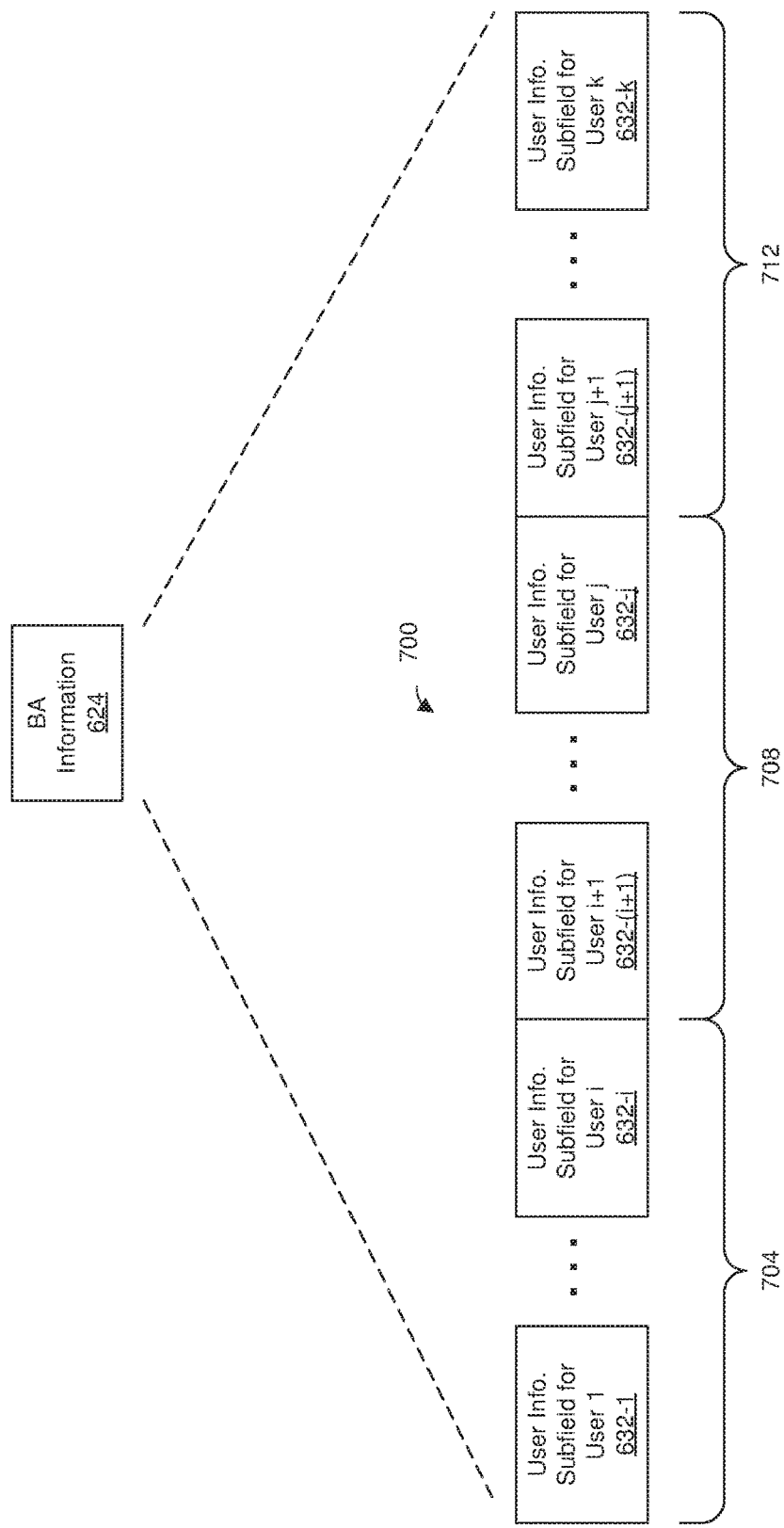
FIG. 7 is a block diagram of an example arrangement of per user information field subfields of FIG. 6B within the block acknowledgement information field of the M-BA frame of FIG. 6A, according to an embodiment.

FIG. 7 is a diagram of an example arrangement of per user information subfields 632 within the M-BA frame 600, according to an embodiment. In particular, the diagram of FIG. 7 illustrates an example ordering of per user information subfields 632 within the M-BA frame 600. For example, the ordering from left to right depicted in FIG. 7 corresponds to an order according to which client stations 154 will process the per user information subfields 632 after receiving the M-BA frame 600.

In an embodiment, the per user information subfields 632 are arranged within the field 624 in groups 704, 708, 712 of adjacent subfields such that each group 704, 708, 712 includes only subfields corresponding to second client stations 154 that have communicated to the AP 114 a same set of supported block acknowledgment techniques. For example, in an embodiment, group 704 includes only per user information subfields 632 that correspond to client stations that only support BA of frame sequences of length 64 (bitmap length=8 octets); group 708 includes only per user information subfields 632 that correspond to client stations that only support BA of frame sequences of lengths 32 (bitmap length=4 octets) and 64 (bitmap length=8 octets); and group 712 includes only per user information subfields 632 that correspond to client stations that support BA of frame sequences of lengths 32 (bitmap length=4 octets), 64 (bitmap length=8 octets), 128 (bitmap length=16 octets), or 256 (bitmap length=32 octets).

When processing the field 624, client stations start at the subfield 632-1 and continue processing subsequent subfields 632 (moving to the right in FIG. 7), and may stop processing the field 624 upon encountering a subfield 632 with a format that is not recognized, according to an embodiment. For example, a client station 154 that does not support BA of frame sequences of lengths 32 (bitmap length=4 octets) starts at the subfield 632-1 and continues processing subsequent subfields 632 (moving to the right in FIG. 7) until, for example, encountering a subfield 632 for a BA of a frame sequence of length 32 (bitmap length=4 octets) in group 708, which is of the second format different than the first format; in response to encountering such a subfield 632 in group 708, the client station 154 stops processing the field 624.

As another example, a client station 154 that does not support BA of sequences of lengths 128 (bitmap length=16 octets) or 256 (bitmap length=32 octets) starts at the subfield 632-1 and continues processing subsequent subfields 632 (moving to the right in FIG. 7) until, for example, encountering a subfield 632 for a BA of a sequence of length 128 (bitmap length=16 octets) or 256 (bitmap length=32 octets) in group 712, which is of the third format different than the first and second formats; in response to encountering such a subfield 632 in group 712, the client station 154 stops processing the field 624.

Although the example illustrated in FIG. 7 includes three groups 704, 708, 712, in other embodiments the per user information subfields 632 are arranged within the field 624 in other suitable numbers of groups such two, four, five, six, etc.

FIG. 8 is a flow diagram of an example method 800 for communication in a wireless communication network, according to an embodiment. In an embodiment, the method 800 is implemented by the network interface device 122 of the AP 114 (FIG. 1), and the method 800 is described in the context of the WLAN 110 merely for explanatory purposes. In some embodiments, however, the method 800 is implemented in another suitable wireless communication network and/or with another suitable communication device.

At block 804, a first communication device (e.g., the MAC processor 126 of the network interface device 122) generates a frame that includes a field having respective acknowledgment information for multiple second communication devices in respective subfields, wherein the subfields have a plurality of different formats, and wherein the subfields are arranged within the field in groups of adjacent subfields such that each group i) includes only subfields of a same format, and/or ii) includes only subfields corresponding to second communication devices that have communicated to the first communication device a same set of supported acknowledgment techniques corresponding to a same set of formats of the subfields.

In an embodiment, the plurality of different formats includes a first format corresponding to acknowledgment of data frames of only a single traffic class, and a second format corresponding to acknowledgment of data frames of a multiple traffic classes. In an embodiment, the subfields are arranged within the field such that: a first group includes only subfields of the first format, a second group includes only subfields of the second format, and the first group is positioned within the field prior to the second group according to an order in which the second communication devices are configured to process subfields within the field.

In an embodiment, the frame is a trigger frame corresponding to a block acknowledgment request (BAR) to the multiple second communication devices; the first group includes only subfields that include information for single traffic class BARs; and the second group includes only subfields that include information for multiple traffic class BARs.

In an embodiment, the plurality of different formats includes a third format corresponding to acknowledgment of GCR data frames; and the subfields are arranged within the field such that: a third group includes only subfields of the third format, and the third group is positioned within the field after the second group according to the order in which the second communication devices are configured to process subfields within the field.

In another embodiment, the plurality of different formats includes: a first format corresponding to a bitmap of a first size, the bitmap of the first size including acknowledgment information for a first number of frames, and a second format corresponding to a bitmap of a second size different than the first size, the bitmap of the second size including acknowledgment information for a second number of frames. In an embodiment, the subfields are arranged within the field such that: a first group includes only subfields corresponding to second communication devices that have communicated to the first communication device a first set of one or more supported acknowledgment techniques that includes: acknowledgment of sequences of frames of the first size, and does not include acknowledgment of sequences of frames of the second size. In an embodiment, a second group includes only subfields corresponding to second communication devices that have communicated to the first communication device a second set of supported acknowledgment techniques that includes acknowledgment of sequences of frames of the first size, and acknowledgment of sequences of frames of the second size. In an embodiment, the first group is positioned within the field prior to the second group according to an order in which the second communication devices are configured to process subfields within the field.

In an embodiment, the frame is an M-BA frame; the first format corresponds to a BA bitmap of the first size; and the second format corresponds to a BA bitmap of the second size.

In an embodiment, the plurality of different formats includes at least a third format corresponding to BA bitmaps of at least a third size different than the first size and the second size; and a third group includes only subfields corresponding to second communication devices that have communicated to the first communication device a third set of supported acknowledgment techniques that includes acknowledgment of sequences of frames of the first size, acknowledgment of sequences of frames of the second size, and acknowledgment of sequences of frames of the third size. In an embodiment, the third group is positioned within the field after the second group according to the order in which the second communication devices are configured to process subfields within the field.

At block 808, the first communication device generates a PHY data unit (e.g., a DL SU PPDU) that includes the frame generated at block 808. For example, in an embodiment, the network interface device 122 (e.g., the PHY processor 130) generate a DL SU PPDU addressed to a group of client stations. In an embodiment, the MAC processor generates the frame (block 804) and provides the frame to the PHY processor 130.

In an embodiment, the network interface device 122 (e.g., the PHY processor 130) upconverts a baseband signal corresponding to the PHY data unit to one or more RF signals and provides the one or more RF signals to the one or more antennas 138.

In an embodiment, a second communication device (e.g., the client station 154-1) receives the PHY data unit generated at block 808. The second communication device (e.g., the network interface 162 of the client station 154-1) processes the frame, including processing the subfields of the field in a particular order, as described above. In an embodiment, the PHY processor 170 downconverts one or more RF signals corresponding to the PHY data unit received via one or more antennas 178, extracts the frame, and provides the frame to the MAC processor 166. The MAC processor 166 then processes the frame, including processing the subfields of the field in a particular order, as described above.

In some embodiments, the AP 114 generates a first PPDU that includes an M-BA frame according to the method of claim 800, and transmits the first PPDU; and subsequently the AP 114 generates a second PPDU that includes an MU-BAR frame according to the method of claim 800, and transmits the second PPDU.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communication in a wireless communication network, the method comprising:
   generating, at a first communication device, a packet associated with acknowledgment of frames corresponding to multiple second communication devices, including:
      generating a frame that includes a field having respective acknowledgment information for the multiple second communication devices in respective subfields, wherein the subfields have a plurality of different formats, and wherein generating the frame includes arranging the subfields within the field in groups of adjacent subfields such that each group i) includes only subfields of a same format, and/or ii) includes only subfields corresponding to second communication devices that have communicated to the first communication device a same set of supported formats of the subfields, and wherein each of at least some of the groups include multiple ones of the subfields;
   transmitting, by the first communication device, the packet to the multiple second communication devices.

2. The method of claim 1, wherein:
   the plurality of different formats includes a first format corresponding to acknowledgment of data frames of only a single traffic class, and a second format corresponding to acknowledgment of data frames of a multiple traffic classes; and
   the subfields are arranged within the field such that:
      a first group includes only subfields of the first format,
      a second group includes only subfields of the second format, and
      the first group is positioned within the field prior to the second group according to an order in which the second communication devices are configured to process subfields within the field.

3. The method of claim 2, wherein:
   the frame is a trigger frame corresponding to a block acknowledgment request (BAR) to the multiple second communication devices;
   the first group includes only subfields that include information for single traffic class BARs; and
   the second group includes only subfields that include information for multiple traffic class BARs.

4. The method of claim 3, wherein:
   the plurality of different formats includes a third format corresponding to acknowledgment of groupcast with retries (GCR) data frames; and
   the subfields are arranged within the field such that:
      a third group includes only subfields of the third format, and
      the third group is positioned within the field after the second group according to the order in which the second communication devices are configured to process subfields within the field.

5. The method of claim 1, wherein:
   the plurality of different formats includes:
      a first format corresponding to a bitmap of a first size, the bitmap of the first size including acknowledgment information for a first number of frames, and
      a second format corresponding to a bitmap of a second size different than the first size, the bitmap of the second size including acknowledgment information for a second number of frames; and the subfields are arranged within the field such that:
a first group includes only subfields corresponding to second communication devices that have communicated to the first communication device a first set of one or more supported acknowledgment techniques supported formats that includes acknowledgment of sequences of frames of the first size, and does not include acknowledgment of sequences of frames of the second size,
a second group includes only subfields corresponding to second communication devices that have communicated to the first communication device a second set of acknowledgment techniques that includes acknowledgment of sequences of frames of the first size, and acknowledgment of sequences of frames of the second size, and
the first group is positioned within the field prior to the second group according to an order in which the second communication devices are configured to process subfields within the field.

6. The method of claim 5, wherein:
the frame is a multi-station block acknowledgment (M-BA) frame corresponding to a block acknowledgment (BA) to the multiple second communication devices;
the first format corresponds to a BA bitmap of the first size;
the second format corresponds to a BA bitmap of the second size.

7. The method of claim 6, wherein:
the plurality of different formats includes at least a third format corresponding to BA bitmaps of at least a third size different than the first size and the second size;
a third group includes only subfields corresponding to second communication devices that have communicated to the first communication device a third set of supported acknowledgment techniques that includes acknowledgment of sequences of frames of the first size, acknowledgment of sequences of frames of the second size, and acknowledgment of sequences of frames of the third size; and
the third group is positioned within the field after the second group according to the order in which the second communication devices are configured to process subfields within the field.

8. The method of claim 6, wherein:
the packet is a first packet;
the field is a first field;
the subfields are first subfields;
the plurality of different formats is a first plurality of different formats;
the method further comprises:
generating, at the first communication device, a further packet associated with requesting from the multiple second communication devices of frames transmitted by the first communication device, including:
generating a trigger frame corresponding to a block acknowledgment request (BAR) to the multiple second communication devices, the trigger frame including a second field having respective BAR information for the multiple second communication devices in respective second subfields, wherein the second subfields have a second plurality of different formats, and wherein the second subfields are arranged within the second field in groups of adjacent second subfields such that each group includes only second subfields of a same format; and
the method further comprises:
transmitting, by the first communication device, the second packet to the multiple second communication devices.

9. The method of claim 8, wherein:
the second plurality of different formats includes a first BAR format corresponding to single traffic class BARs, and a second BAR format corresponding to multiple traffic classes BARs; and
the second subfields are arranged within the second field such that:
a first group includes only second subfields of the first BAR format,
a second group includes only subfields of the second BAR format, and
the first group is positioned within the second field prior to the second group according to an order in which the second communication devices are configured to process second subfields within the second field.

10. The method of claim 9, wherein:
the second plurality of different formats includes a third format corresponding to acknowledgment of groupcast with retries (GCR) data frames; and
the second subfields are arranged within the second field such that:
a third group includes only subfields of the third format, and
the third group is positioned within the field after the second group according to the order in which the second communication devices are configured to process subfields within the field.

11. An apparatus, comprising:
a network interface device associated with a communication device, wherein the network interface device includes one or more integrated circuits (ICs) configured to:
generate a packet associated with acknowledgment of frames corresponding to multiple second communication devices, including:
generating a frame that includes a field having respective acknowledgment information for the multiple second communication devices in respective subfields, wherein the subfields have a plurality of different formats, and wherein generating the frame includes arranging the subfields within the field in groups of adjacent subfields such that each group i) includes only subfields of a same format, and/or ii) includes only subfields corresponding to second communication devices that have communicated to the first communication device a same set of supported formats of the subfields, and wherein each of at least some of the groups include multiple ones of the subfields;
wherein the network interface device is configured to transmit the packet to the multiple second communication devices.

12. The apparatus of claim 11, wherein:
the plurality of different formats includes a first format corresponding to acknowledgment of data frames of only a single traffic class, and a second format corresponding to acknowledgment of data frames of a multiple traffic classes; and the one or more ICs are configured to arrange the subfields within the field such that:
  a first group includes only subfields of the first format,
  a second group includes only subfields of the second format, and
  the first group is positioned within the field prior to the second group according to an order in which the second communication devices are configured to process subfields within the field.

13. The apparatus of claim 12, wherein:
the frame is a trigger frame corresponding to a block acknowledgment request (BAR) to the multiple second communication devices;
the first group includes only subfields that include information for single traffic class BARs; and
the second group includes only subfields that include information for multiple traffic class BARs.

14. The apparatus of claim 13, wherein:
the plurality of different formats includes a third format corresponding to acknowledgment of groupcast with retries (GCR) data frames; and
the one or more ICs are configured to arrange the subfields within the field such that:
  a third group includes only subfields of the third format, and
  the third group is positioned within the field after the second group according to the order in which the second communication devices are configured to process subfields within the field.

15. The apparatus of claim 11, wherein:
the plurality of different formats includes:
  a first format corresponding to a bitmap of a first size, the bitmap of the first size including acknowledgment information for a first number of frames, and
  a second format corresponding to a bitmap of a second size different than the first size, the bitmap of the second size including acknowledgment information for a second number of frames; and
the one or more ICs are configured to arrange the subfields within the field such that:
  a first group includes only subfields corresponding to second communication devices that have communicated to the first communication device a first set of one or more supported acknowledgment techniques supported formats that includes acknowledgment of sequences of frames of the first size, and does not include acknowledgment of sequences of frames of the second size,
  a second group includes only subfields corresponding to second communication devices that have communicated to the first communication device a second set of acknowledgment techniques that includes acknowledgment of sequences of frames of the first size, and acknowledgment of sequences of frames of the second size, and
  the first group is positioned within the field prior to the second group according to an order in which the second communication devices are configured to process subfields within the field.

16. The apparatus of claim 15, wherein:
the frame is a multi-station block acknowledgment (M-BA) frame corresponding to a block acknowledgment (BA) to the multiple second communication devices;
the first format corresponds to a BA bitmap of the first size;
the second format corresponds to a BA bitmap of the second size.

17. The apparatus of claim 16, wherein:
the plurality of different formats includes at least a third format corresponding to BA bitmaps of at least a third size different than the first size and the second size;
a third group includes only subfields corresponding to second communication devices that have communicated to the first communication device a third set of supported acknowledgment techniques that includes acknowledgment of sequences of frames of the first size, acknowledgment of sequences of frames of the second size, and acknowledgment of sequences of frames of the third size; and
the one or more ICs are configured to arrange the subfields within the field such that the third group is positioned within the field after the second group according to the order in which the second communication devices are configured to process subfields within the field.

18. The apparatus of claim 16, wherein:
the packet is a first packet;
the field is a first field;
the subfields are first subfields;
the plurality of different formats is a first plurality of different formats;
the one or more ICs are further configured to:
  generate a further packet associated with requesting from the multiple second communication devices of frames transmitted by the first communication device, including:
    generating a trigger frame corresponding to a block acknowledgment request (BAR) to the multiple second communication devices, the trigger frame including a second field having respective BAR information for the multiple second communication devices in respective second subfields, wherein the second subfields have a second plurality of different formats, and wherein the second subfields are arranged within the second field in groups of adjacent second subfields such that each group includes only second subfields of a same format; and
the network interface device is further configured to transmit the second packet to the multiple second communication devices.

19. The apparatus of claim 18, wherein:
the second plurality of different formats includes a first BAR format corresponding to single traffic class BARs, and a second BAR format corresponding to multiple traffic classes BARs; and
the one or more ICs are configured to arrange the second subfields within the second field such that:
  a first group includes only second subfields of the first BAR format,
  a second group includes only subfields of the second BAR format, and
  the first group is positioned within the second field prior to the second group according to an order in which the second communication devices are configured to process second subfields within the second field.

20. The apparatus of claim 19, wherein:
the second plurality of different formats includes a third format corresponding to acknowledgment of groupcast with retries (GCR) data frames; and
the one or more ICs are configured to arrange the second subfields within the second field such that:

a third group includes only subfields of the third format, and the third group is positioned within the field after the second group according to the order in which the second communication devices are configured to process subfields within the field.

\* \* \* \* \*